(12) United States Patent
Vukovic et al.

(10) Patent No.: US 7,024,216 B2
(45) Date of Patent: Apr. 4, 2006

(54) METHOD AND APPARATUS FOR ALLOCATING A COMMUNICATION RESOURCE IN A BROADBAND COMMUNICATION SYSTEM

(75) Inventors: Ivan N. Vukovic, Arlington Heights, IL (US); Tyler Brown, Mundelein, IL (US)

(73) Assignee: Motorola, Inc., Schaumburg, IL (US)

( * ) Notice: Subject to any disclaimer, the term of this patent is extended or adjusted under 35 U.S.C. 154(b) by 611 days.

(21) Appl. No.: 09/886,642

(22) Filed: Jun. 21, 2001

(65) Prior Publication Data

US 2002/0198012 A1    Dec. 26, 2002

(51) Int. Cl.
*H04B 7/00* (2006.01)

(52) U.S. Cl. .......... 455/509; 455/450; 455/452.1; 455/515

(58) Field of Classification Search ........ 455/509, 455/450, 451.1, 452.2, 452.1, 409, 515; 370/329, 370/330
See application file for complete search history.

(56) References Cited

U.S. PATENT DOCUMENTS 5,946,356 A     8/1999  Felix et al. .............. 375/295
6,366,779 B1 *  4/2002  Bender et al. ........... 455/450

FOREIGN PATENT DOCUMENTS

| EP | 0 765 096 A2 | | 3/1997 |
|---|---|---|---|
| WO | WO 99/37114 A2 | | 7/1999 |
| WO | 00/57663 | * | 9/2000 |
| WO | WO 00/57663 | * | 9/2000 |
| WO | WO 00/57663 A1 | | 9/2000 |
| WO | WO 01/05050 A1 | | 1/2001 |

OTHER PUBLICATIONS

ETSI TS 125.321 V3.11.0 (Mar. 2002) Universal Mobile Telecommunications System (UMTS); Medium Access Control (MAC) Protocol Specification (3GPP). 1999, section 11.2, pp 30-35.

* cited by examiner

*Primary Examiner*—Nay Maung
*Assistant Examiner*—Angelica M. Perez
(74) *Attorney, Agent, or Firm*—Steven A. May

(57) ABSTRACT

A communication resource that includes a communication channel is allocated in response to a received communication resource access request, wherein the access request is received while a message received via the communication channel is being demodulated. In response to receiving the request, a grant of access to the communication channel is generated and transmitted, which grant authorizes the source of the access request to use the communication channel.

21 Claims, 3 Drawing Sheets

500

METHOD AND APPARATUS FOR ALLOCATING A COMMUNICATION RESOURCE IN A BROADBAND COMMUNICATION SYSTEM

FIELD OF THE INVENTION

The present invention relates generally to cellular communication systems, and, in particular, to allocation of a communication resource in a broadband communication system.

BACKGROUND OF THE INVENTION

Wireless communication systems are well known and consist of many types, including land mobile radio, cellular radiotelephone, and personal communication systems. With each communication system, data is transmitted between a transmitting communication device and a receiving communication device via a communication resource that includes a communication channel that operates over a physical resource, typically a frequency bandwidth. Bandwidth is limited and equipment is expensive, and therefore many schemes have been developed for multiplexing many different users over the same frequency bandwidth.

One such communication system currently being developed is the next generation Code Division Multiple Access (CDMA) cellular communication system, commonly referred to as Wideband Code Division Multiple Access (WCDMA). In a WCDMA communication system, all mobile station and base station transmissions occur simultaneously within the same frequency band. Therefore, a received signal at a base station or a mobile station comprises a multiplicity of frequency and time overlapping coded signals from mobile stations or base stations, respectively. Each of the coded signals included in the received signal is transmitted simultaneously at the same radio frequency and is distinguishable only by the coded signal's specific orthogonal code (i.e., a communication channel).

A typical WCDMA communication system 100 of the prior art is shown in FIG. 1. Under current WCDMA Random Access Channel (RACH) standards, that is, European Telecommunications Standards Institute Technical Specifications (ETSI TS) 3GPP specifications TS25.215 and TS25.321, a mobile station (MS) 102 requests a first communication channel, that is, a reverse link traffic channel, 104 by transmitting a series of preambles via a second communication channel, that is, a reverse link control channel, 106 to a wireless infrastructure that includes a base station 108. MS 102 adjusts the power level of each preamble of the series of preambles so that each preamble is transmitted at a different power level than the other preambles in the series of preambles. In turn, base station 108 grants MS 102 access to communication channel 104 by acknowledging a preamble that is received at an appropriate power level. Upon receiving an acknowledgment ('ACK') of a preamble from base station 108, MS 102 transmits a message to the base station in communication channel 104. In turn, so long as MS 102 fails to receive an acknowledgment of a preamble, MS 102 continues to transmit preambles to base station 108.

By MS 102 varying the power levels of the preambles, and base station 108 acknowledging only an appropriately power-adjusted preamble, MS 102 and base station 108 are able to determine an appropriate power level for their communications. Thus the preambles serve both a power control function and an access request function. However, base station 108 will not acknowledge a preamble so long as a demodulator 110 in the base station is engaged in demodulation of a signal received via communication channel 104. Instead, when base station 108 receives an appropriately power-adjusted access request and no communication channel is available, the base station transmits a NAK to MS 102. In response to receiving the NAK, MS 302 backs off for a random period of time and then repeats the process of transmitting a series of successively incremented communication resource access requests.

For example, FIG. 2 is a timing diagram 200 of an exemplary process of allocating a communication resource of the prior art. FIG. 2 includes multiple time lines 214–216 that respectively correspond to MS 102, base station 108, and demodulator 110 and that are each subdivided into multiple time units 218. Each time unit has a time duration of 1.33 milliseconds (ms), which is a typical length of an access slot, or preamble transmission, in a CDMA communication system.

As depicted in FIG. 2, MS 102 transmits a first preamble 202 at a time when demodulator 110 is demodulating a first message 212. If preamble 202 is at an appropriate power level but demodulator 110 is engaged when base station 108 receives the preamble, the base station does not acknowledge the preamble (assuming that preamble 202 is at an appropriate power level) and instead transmits a NAK 203 to MS 102. In response to receiving the NAK, MS 102 backs off for a random period of time and then repeats the process of transmitting a series of successively incremented preambles 204, 206, 208. By the time base station 108 receives a second appropriately power-adjusted level preamble 208, demodulator 110 has finished demodulating message 212. Since demodulator 110 is now available to demodulate a new message, base station 108 transmits an ACK 210 back to MS 102. Upon receiving ACK 210, MS 102 transmits message 214 to base station 108, which conveys the message to demodulator 110 for demodulation.

Since base station 108 does not acknowledge an appropriately power-adjusted preamble until demodulator 110 is available to demodulate a new message, the demodulator may be idle for a period of time 220 corresponding to awaiting receipt by the base station of a new, appropriately power-adjusted preamble 208, acknowledgment by the base station of the new preamble, transmission of a message by the MS in response to receiving the acknowledgment, and receipt of the message by the base station. Such idle time is wasted time that reduces a throughput of communication channel 104 and a user capacity of system 100. Furthermore, the repeated preamble transmissions consume a capacity of control channel 106.

Therefore, a need exists for a method and an apparatus for communication resource allocation that reduces the idle time of a demodulator and that increases the throughput of a communication channel and the capacity of a broadband communication system.

DETAILED DESCRIPTION OF THE INVENTION

Figure 1:
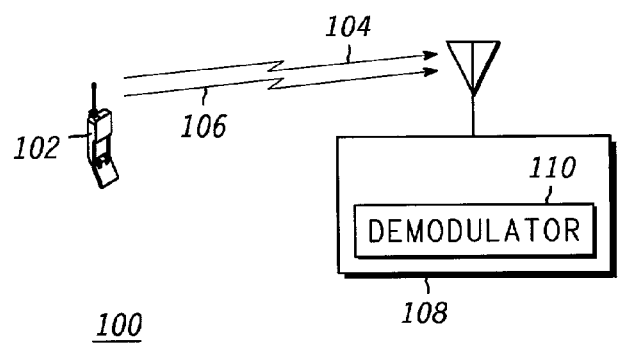
FIG. 1 is a block diagram of a communication system of the prior art.
Figure 2:
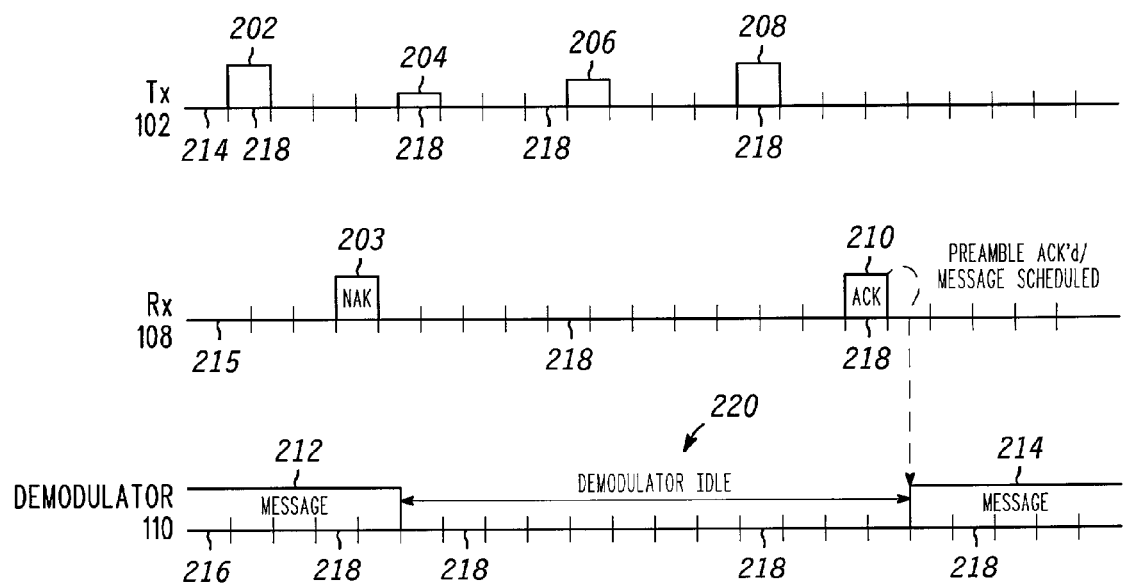
FIG. 2 is a timing diagram of an exemplary process of allocating a communication resource of the prior art.

To address the need for a method and an apparatus for channel reservation that reduces the idle time of a demodulator and that increases the throughput of a communication channel and the capacity of a broadband communication system, a communication resource that includes a communication channel is allocated in response to a received communication resource access request, wherein the access request is received while a message received via the communication channel is being demodulated. In response to receiving the request, a grant of access to the communication channel is generated and transmitted, which grant authorizes the source of the access request to use the communication channel.

Generally, one embodiment of the present invention encompasses a method for allocating a communication resource in a broadband communication system, wherein the communication resource comprises a communication channel. The method includes steps of receiving a communication resource access request at a time that data received via the communication channel is currently being demodulated, and, in response to receiving the access request, transmitting a grant of access to the communication channel.

Another embodiment of the present invention encompasses an apparatus for allocating a communication resource in a broadband communication system, wherein the communication resource comprises a communication channel. The apparatus includes an access request detector that detects a receipt of a communication resource access request and a demodulator coupled to the access request detector is capable of demodulating messages received via the communication channel. The apparatus further includes a means for generating a grant of access to the communication channel and the demodulator in response to reception of the communication resource access request, wherein the communication resource access request is received at a time that the demodulator is engaged in a demodulation of a received message.

Still another embodiment of the present invention encompasses a communication device that is capable of operating in a broadband communication system. The communication device includes a receiver for receiving an communication resource access request and an access request detector coupled to the receiver that detects a receipt of the communication resource access request. The communication device further includes a demodulator coupled to the access request detector is capable of demodulating messages received via a communication channel and a means for generating a grant of access to the demodulator in response to reception of the communication resource access request, wherein the communication resource access request is received at a time that the demodulator is engaged in a demodulation of an already received message. The communication device further includes a modulator for modulating the access grant onto a radio frequency signal to produce a modulated access grant and a transmitter for transmitting the modulated access grant.

Figure 3:
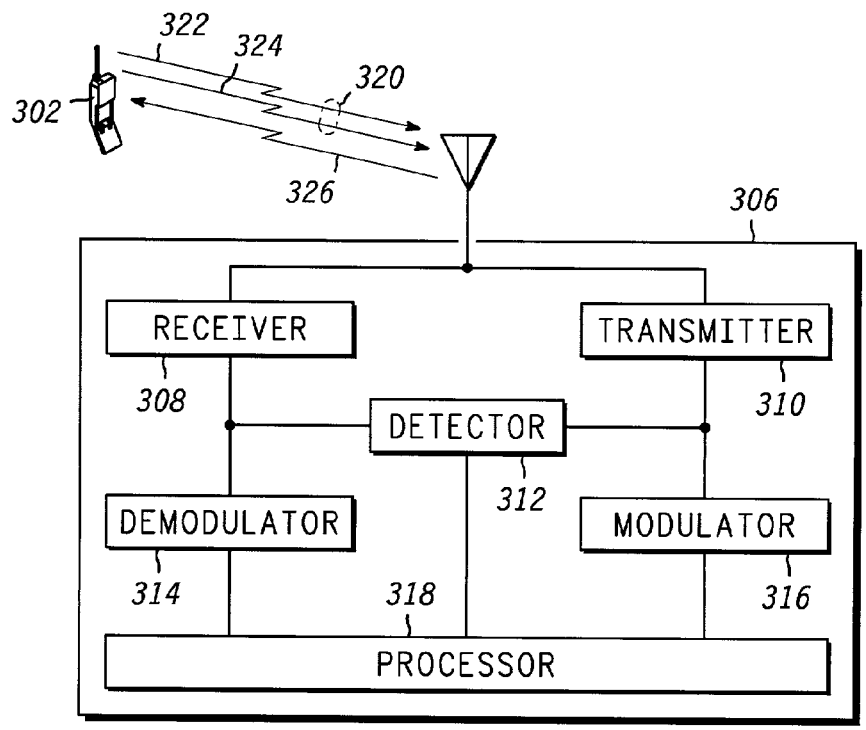
FIG. 3 is a block diagram of a communication system in accordance with an embodiment of the present invention.

The present invention may be more fully described with reference to FIGS. 3–5. FIG. 3 is a block diagram of a communication system 300 in accordance with an embodiment of the present invention. Communication system 300 includes at least one mobile station (MS) 302 and a base station 306 that provides communications services to the MS. MS 302 and base station 306 are each capable of operating as a transmitting communication device or a receiving communication device in system 300. Base station 306 includes a receiver 308, a transmitter 310, an access request detector 312, preferably a preamble detection application specific integrated circuit (ASIC), coupled to the receiver, a demodulator 314 coupled to the receiver and the detector, a modulator 316 coupled to the transmitter, and a processor 318 coupled to each of the demodulator, the modulator, and the access request detector. Demodulator 314 demodulates a signal received by base station 306 based on a modulation scheme, such as a quadrature amplitude modulation (QAM) scheme, binary phase shift keying (BPSK) modulation scheme, or a quadrature phase shift keying (QPSK) modulation scheme, to produce a demodulated signal. Modulator 316 performs an inverse function to the function performed by demodulator 314, modulating a data stream received from processor 318 based on the modulation scheme to produce a modulated signal. In other embodiments of the present invention, processor 318 may include one of more of access request detector 312, demodulator 314, and modulator 316.

Communication system 300 preferably comprises a spread spectrum communication system, such as a wideband code division multiple access (WCDMA). A radio frequency (RF) communication resource 320 comprises a frequency bandwidth that includes multiple communication channels 322, 324 (two shown). Each communication channel of the multiple communication channels 322, 324 is covered by an orthogonal code sequence, preferably a Walsh Code, that is orthogonal to all other orthogonal code sequences that are transmitted in the frequency bandwidth. A transmitting communication device in system 300 transmits information by covering the information with the appropriate orthogonal code sequence and spreading the covered information with a pseudo-noise (PN) sequence to produce a spectrally spread signal. The spectrally spread signal is modulated pursuant to a modulation scheme, such as a quadrature amplitude modulation (QAM) scheme, binary phase shift keying (BPSK) modulation scheme, or a quadrature phase shift keying (QPSK) modulation scheme, to produce a modulated signal that is transmitted to a receiving communication device. In turn, the receiving communication device receives the modulated signal and demodulates the signal based on the modulation scheme applied by the transmitting communication device to produce a demodulated signal. The demodulated signal is despread with the PN sequence used to spread the transmitted signal and uncovered by the channel assigned orthogonal code sequence in order to recover the transmitted information.

When MS 302 desires to access a communication channel 322, preferably a reverse link traffic channel, of communication resource 320, the MS transmits a series of communication resource access requests, preferably preambles, to base station 306 via a communication channel 324, preferably a reverse link control channel, of the communication resource. The transmission of preambles to a base station in order to reserve a resource is described by current ETSI TS 3GPP specification TS25.213, which specification is hereby incorporated herein. MS 302 adjusts (typically increments) a power level of each access request of the series of access requests until receiving an 'ACK' (acknowledgment) or a 'NAK' back from base station 306. Typically, each access request of the series of access requests is separated from an immediately preceding access request by a minimum of three or four access slots time units, wherein each access slot time unit has a time duration of 1.33 milliseconds (ms), which is a typical length of a preamble in a CDMA communication system.

When the access request is of an appropriate power level, base station 306 acknowledges the access request by transmitting an acknowledgment to MS 302. Preferably, the acknowledgment is transmitted via a forward link control channel 326; however, those who are of ordinary skill in the art realize that numerous methods of transmitting the acknowledgment exist. When MS 302 receives the acknowledgment, MS 302 understands that the most recently transmitted access request was at an appropriate power level for a transmission of a message. The acknowledgment also functions as an access grant by base station 306 in that MS 302 further understands, upon receiving the acknowledgment, that the MS is authorized to use, that is, is granted access to, communication channel 322 and, concomitantly, demodulator 314.

By transmitting the series of access requests to base station 306 wherein the power level of each access request is different than the power levels of the other access request, and receiving an acknowledgment of an appropriately power-adjusted access request, MS 302 and base station 306 are able to determine an appropriate power level for a subsequent transmission of a message by the MS. Furthermore, by acknowledging an access request, base station 306 informs MS 302 that a traffic channel 322 and demodulator 314 are available for use by MS 102.

In prior art communication system 100, when demodulator 110 is currently engaged in demodulation of a message received via the communication channel and an appropriately power-adjusted preamble is received, the base station 108 transmits a NAK. That is, base station 108 will not acknowledge a preamble so long as demodulator 110 is engaged in demodulation of a received message, resulting in excessive demodulator idle time. In order to reduce the demodulator idle time and increase system capacity, base station 306 of communication system 300 can acknowledge the access request even while demodulator 314 is in the process of demodulating a received message.

When base station 306 receives an appropriately power-adjusted access request, the base station, preferably access request detector 312, detects that an access request has been received. Access request detector 312 then communicates with processor 318 to determine whether the demodulator is available to demodulate a new message. If demodulator 314 is engaged in demodulation of a received message, such as user information data, then base station 306, preferably processor 318, determines an amount of time remaining until the demodulator is projected to be available. Alternatively, base station 306, preferably processor 318 or alternatively access request detector 312 or demodulator 314, may determine an amount of time remaining until demodulator 314 is projected to be available upon receipt of the message being demodulated or any time thereafter.

ETSI TS 3GPP specification TS25.216, which specification is hereby incorporated herein, provides that messages are transmitted in frames. The frames are of a known fixed length, or alternatively are of a variable length that is known to both the transmitting communication device and the receiving communication device. Based on when base station 306 begins receiving a message and further based on a known length of the message, base station 306, preferably processor 318 or alternatively access request detector 312 or demodulator 314, determines a time when demodulator 314 is projected to finish demodulating the received message and to be available to demodulate a new message.

In response to the receipt of the access request and based on the determined amount of time remaining until the demodulator is projected to be available, base station 306, preferably processor 318 or alternatively access request detector 312, generates an access grant and conveys the access grant to MS 302 via modulator 316 and transmitter 310. The access grant preferably is an acknowledgment ('ACK') of the access request and is conveyed at a time that is designed to minimize the idle time of demodulator 314. Preferably, the access grant is transmitted by base station 306 sometime during a time interval 'T' prior to the time that demodulator 314 is projected to be available. The time interval 'T' is determined based on a determined amount of time remaining until demodulator 314 becomes available and an amount of time required by MS 302 to receive an access grant, process the access grant, and transmit a message in response to the access grant. The amount of time required by MS 302 to receive an access grant, process the access grant, and transmit a message in response to the access grant may either be predetermined and programmed into base station 306 or may be determined by base station 306 through signaling with MS 302. By transmitting the access grant at a time that is based on the projected availability of demodulator 314, rather than waiting to consider an access request until the demodulator is actually available, base station 306 can coordinate a receipt of a new message from MS 302 with a projected freeing up of the demodulator, thereby minimizing the idle time of the demodulator.

Figure 4:
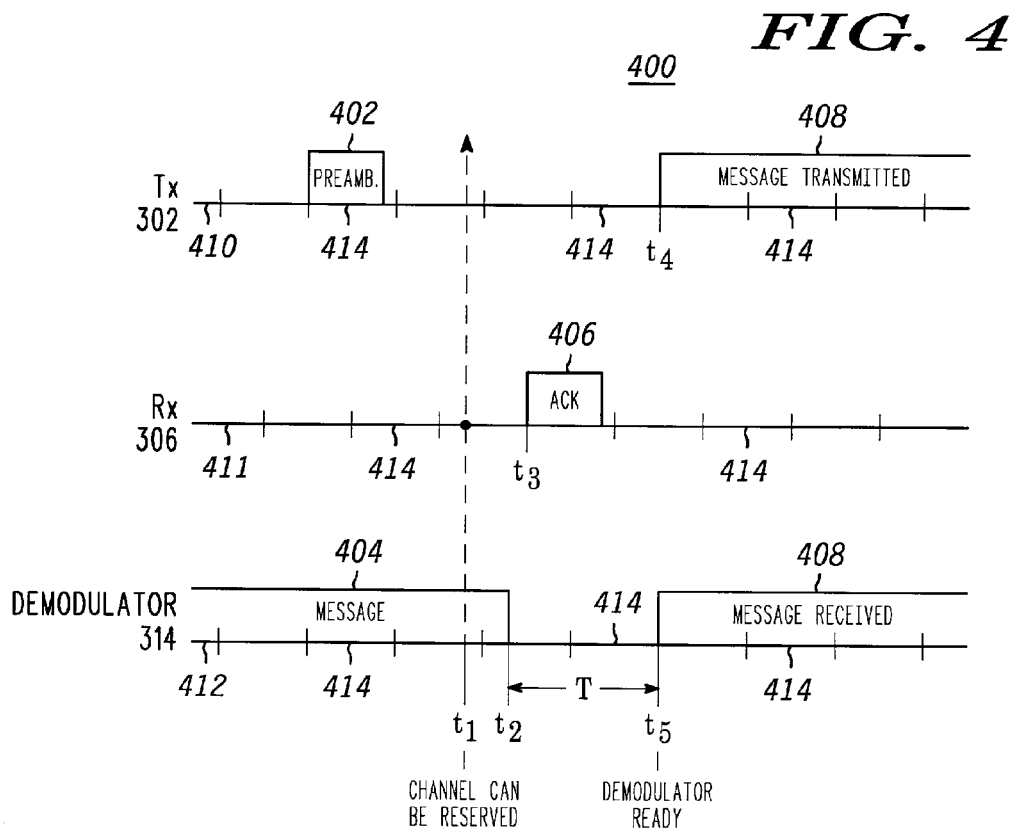
FIG. 4 is a timing diagram of an exemplary process of allocating a communication resource in accordance with an embodiment of the present invention.

For example, FIG. 4 is a timing diagram 400 of an exemplary process of allocating a communication resource in accordance with an embodiment of the present invention. Timing diagram 400 assumes perfect channel conditions and zero propagation delay. FIG. 4 is presented for the purpose of illustrating the principles of the present invention and is not intended to limit the invention in any way. FIG. 4 includes multiple time lines 410–412 that respectively correspond to MS 302, base station 306, and demodulator 314 and that are each subdivided into multiple time units 414. Each time unit preferably has a time duration of 1.33 milliseconds (ms), which is an access slot, or preamble transmission, in a CDMA communication system.

As depicted in FIG. 4, MS 302 transmits an appropriately power adjusted communication resource access request 402, preferably a preamble, at a time when demodulator 314 is demodulating a first message 404. In response to the receipt of access request 402, base station 306 determines a time $t_2$ when demodulator 314 will finish demodulating first message 404. However, in other embodiments of the present invention, time $t_2$ and/or any one or more of time interval 'T' and times $t_1$, $t_3$, and $t_5$, as described below, may be determined at the time that base station 306 receives first message 404 or at any time thereafter.

Base station 306 determines time $t_2$ based on a known time when first message 404 was received by the base station and a known length of the first message. Based on time $t_2$, base station 306 determines a time $t_5$ when demodulator 314 will be available for demodulation of a second message 408. Base station 306 further determines a time interval 'T' 420 corresponding to a projected time expiration between a conveyance, by base station 306 to MS 302, of a grant of access to communication channel 322 and a receipt by the base station of a second message 408 from MS 302 in response to the access grant. The determination of time interval 'T' 420 is preferably based on an amount of time required by MS 302 to receive an access grant, preferably an ACK, 406, process the ACK, and transmit second message 408 in response to receiving the ACK.

Based on the determined time $t_5$ and time interval 'T', base station 306 determines a time $t_1$ that corresponds to the earliest time that the base station can grant access to MS 302 to transmit a message in communication channel 322. Base station 306 can then convey an access grant to MS 302 at the determined time $t_1$ or at any time thereafter in response to an appropriately power-adjusted access request, even if the access request is received when demodulator 314 is engaged in the demodulation of an already received message. For example, as depicted in FIG. 4, base station 306 transmits an access grant 406 at a time $t_3$ based on a receipt of access request 402, even though demodulator 314 is engaged in the demodulation of message 404 when the access request is received. Optimally, base station 306 determines time $t_3$ such that MS 302 can receive the access grant, process the access grant, and transmit a second message 408 at a time $t_4$ that results in minimal demodulator 314 idle time (i.e., the time difference between time $t_2$ and time $t_5$).

By considering an access request 402 received prior to completion of demodulation of an earlier received message 404, communication system 300 is able to reduce, relative to the prior art, idle time between demodulation of the earlier received message and modulation of a subsequently received message. Base station 306 determines a time when demodulator 314 will be ready to demodulate a succeeding message based on a length of a received message 404. Based on the determined ready time and a known access grant processing time of an MS 302, base station 306 transmits an access grant to an MS 302 from which the base station has received an appropriate access request 402. A timing of the transmission of access grant 406 is designed to minimize the idle time of demodulator 314 of base station 306. By reducing the idle time, communication system 300 can operate at increased user capacity, and communication channel 322 can operate at increased throughput, relative to the prior art since a length of an idle, non-information bearing time period in system 300 is reduced.

Figure 5:
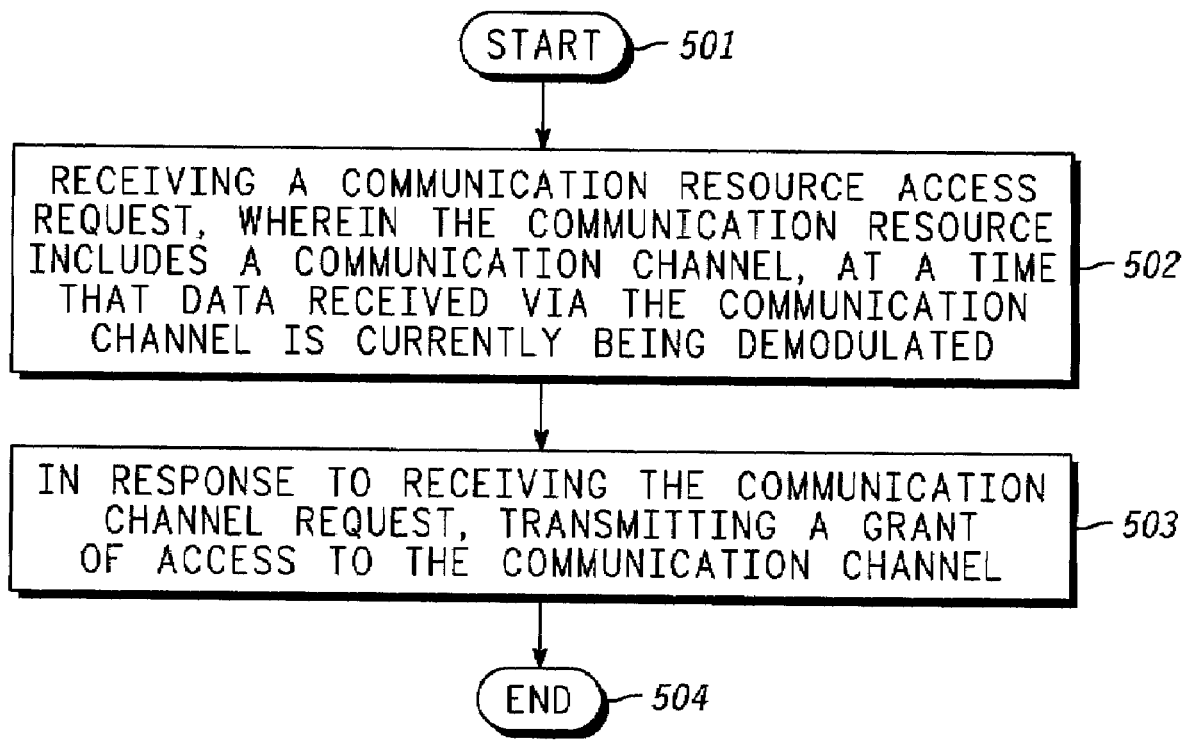
FIG. 5 is a logic flow diagram of a method for allocating a communication resource in a broadband communication system in accordance with an embodiment of the present invention.

FIG. 5 is a logic flow diagram 500 of a method for allocating, in a broadband communication system, a communication resource that includes a communication channel in accordance with an embodiment of the present invention. The method begins (501) when a communication device receives (502) a communication resource access request, preferably a preamble, at a time that data received via the communication channel is currently being demodulated. In response to reception of the access request, the communication device transmits (503) a grant of access, preferably an acknowledgment, to the communication channel, and the logic flow ends (504). The access grant authorizes the source of the access request to use the communication channel. The transmission by the communication device of the access grant may occur either prior to completion of, upon completion of, or after completion of the demodulation of the data.

Preferably, the step of transmitting (504) a grant of access to the communication channel includes the following steps. The communication device determines a time that a demodulator will be available and determines a time that a grant of access to the communication channel can be transmitted based on the time that the demodulator will be available. The communication device then transmits an access grant based on the received request and on the determined time that the grant of access to the communication channel can be transmitted.

In other embodiments of the present invention, the step of transmitting (504) a grant of access to the communication channel may further include one or more of the following steps. The communication device may determine a time that the demodulator will finish demodulating the received message, then determining the time that the demodulator will be available based on the determined time that the demodulator will finish demodulating the received message. The communication device may also determine a time interval between the time that the demodulator will be available and a time that an access grant can be transmitted, then determining the time that an access grant can be transmitted based on the determined time interval.

In sum, a method and apparatus is provided for allocation of a communication resource that includes a communication channel in response to a received communication resource access request, wherein the access request is received while a message received via the communication channel is being demodulated. In response to receiving the request, a grant of access to the communication channel is generated and transmitted, which grant authorizes the source of the access request to use the communication channel.

While the present invention has been particularly shown and described with reference to particular embodiments thereof, it will be understood by those skilled in the art that various changes may be made and equivalents substituted for elements thereof without departing from the spirit and scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. In a broadband communication system, a method for allocating a communication resource that comprises a reverse link traffic channel, the method comprising steps of:
  receiving a communication resource access request at a time that data received via the reverse link traffic channel is currently being demodulated; and
  in response to receiving the communication resource access request, transmitting a grant of access to the reverse link traffic channel wherein the step of transmitting a grant of access to the reverse link traffic channel comprises steps of: determining a time that a demodulator will be available; determining a time that a grant of access to the reverse link traffic channel can be transmitted based on the time that the demodulator will be available; and transmitting an access grant based on the received request and on the determined time that the grant of access to the reverse link traffic channel can be transmitted.

2. The method of claim 1, wherein the access grant is transmitted prior to completion of the demodulation of the data.

3. The method of claim 1, wherein the step of transmitting a grant of access to the reverse link traffic channel further comprises a step of determining a time that the demodulator will finish demodulating the received message.

4. The method of claim 1, wherein the step of transmitting a grant of access to the reverse link traffic channel further comprises a step of determining a time interval between the time that the demodulator will be available and the time that an access grant can be transmitted.

5. The method of claim 1, wherein the communication resource access request is a preamble.

6. The method of claim 1, wherein the access grant is an acknowledgment.

7. An apparatus for allocating a communication resource in a broadband communication system, wherein the communication resource comprises a reverse link traffic channel, the apparatus comprising:
- an access request detector that detects a receipt of a communication resource access request;
- a demodulator that is capable of demodulating messages received via the reverse link traffic channel;
- a means for generating a grant of access to the reverse link traffic channel and the demodulator in response to reception of the communication resource access request; and
- wherein the communication resource access request is received at a time that the demodulator is engaged in a demodulation of a message received via the reverse link traffic channel wherein the means for generating a grant of access to the reverse link traffic channel comprises: a means for determining a time that a demodulator will be available; a means for determining a time of transmission of a grant of access to the reverse link traffic channel based on the determined time of demodulator availability; and a means for generating an access grant based on the received communication resource access request and on the determined time of transmission of the access grant.

8. The apparatus of claim 7, wherein the access grant is generated prior to completion of demodulation of the message.

9. The apparatus of claim 7, wherein the means for generating a grant of access to the reverse link traffic channel further comprises a means for determining a time that the demodulator will finish demodulating the received message.

10. The apparatus of claim 7, wherein the means for generating a grant of access to the reverse link traffic channel further comprises a means for determining a time interval between the time that the demodulator will be available and the time that an access grant may be transmitted.

11. The apparatus of claim 7, wherein the access grant comprises an acknowledgment.

12. The apparatus of claim 7, wherein the communication resource access request comprises a preamble and wherein the access request detector comprises a preamble detector that detects a preamble in a received signal.

13. A communication device capable of operating in a broadband communication system, the communication device comprising:
- a receiver for receiving an communication resource access request;
- an access request detector coupled to the receiver that detects a receipt of the communication resource access request;
- a demodulator coupled to the receiver that is capable of demodulating messages received via reverse link traffic channel;
- a means for generating a grant of access to the demodulator in response to reception of the communication resource access request;
- a modulator for modulating the access grant onto a radio frequency signal to produce a modulated access grant;
- a transmitter for transmitting the modulated access grant and
- wherein the communication resource access request is received at a time that the demodulator is engaged in a demodulation of a message received via the reverse link traffic channel wherein the means for generating a grant of access to the reverse link traffic channel comprises: a means for determining a time that the demodulator will be available; a means for determining a time of transmission of a grant of access to the reverse link traffic channel based on the determined time of demodulator availability; and a means for generating an access grant based on the received communication resource access request and on the determined time of transmission of the access grant.

14. The communication device of claim 13, wherein the access grant is generated when the demodulator is engaged in a demodulation of an already received message.

15. The communication device of claim 13, wherein the means for generating a grant of access to the reverse link traffic channel further comprises a means for determining a time that the demodulator will finish demodulating the received message.

16. The communication device of claim 13, wherein the means for generating a grant of access to the reverse link traffic channel further comprises a means for determining a time interval between the time that the demodulator will be available and the time that an access grant may be transmitted.

17. The communication device of claim 13, wherein the communication resource access request comprises a preamble and wherein the access request detector comprises a preamble detector capable of detecting the preamble.

18. The communication device of claim 13, wherein the access grant comprises an acknowledgment.

19. The method of claim 1, further comprising a step of determining an earliest time that a grant of access to the reverse link traffic channel can be conveyed to a mobile station and wherein transmitting comprises transmitting the grant of access to the mobile station at or after the determined earliest time.

20. The apparatus of claim 7, wherein the means for generating a grant of access to the communication channel comprises a means for determining an earliest lime that a grain of access to the reverse link traffic channel can be conveyed to a mobile station and wherein the apparatus further comprises a means for conveying the grant of access to the mobile station at or after the determined earliest time.

21. The communication device of claim 13, wherein the means for generating a grain of access to the communication channel comprises a means for determining an earliest time tat a grant of access to the reverse link traffic channel can be conveyed to a mobile station and wherein the apparatus further comprises a means for conveying the grant of access to the mobile station at or after the determined earliest time.

* * * * *